US011470140B2

(12) United States Patent
Zisman et al.

(10) Patent No.: US 11,470,140 B2
(45) Date of Patent: Oct. 11, 2022

(54) METHOD AND SYSTEM FOR MULTI-CHANNEL VIEWING

(71) Applicant: DAZN MEDIA ISRAEL LTD., Tel Aviv (IL)

(72) Inventors: Guy Zisman, Ramat Gan (IL); Amir Segev, Rannana (IL)

(73) Assignee: DAZN MEDIA ISRAEL LTD., Tel Aviv (IL)

( * ) Notice: Subject to any disclaimer, the term of this patent is extended or adjusted under 35 U.S.C. 154(b) by 0 days.

(21) Appl. No.: 16/946,444

(22) Filed: Jun. 22, 2020

(65) Prior Publication Data

US 2020/0329089 A1    Oct. 15, 2020

Related U.S. Application Data

(63) Continuation-in-part of application No. 16/795,619, filed on Feb. 20, 2020.

(60) Provisional application No. 62/866,149, filed on Jun. 25, 2019, provisional application No. 62/807,933, filed on Feb. 20, 2019.

(51) Int. Cl.
| | |
|---|---|
| *G06F 15/16* | (2006.01) |
| *H04L 65/70* | (2022.01) |
| *H04N 21/462* | (2011.01) |
| *H04N 21/845* | (2011.01) |
| *H04N 21/4402* | (2011.01) |

(52) U.S. Cl.
CPC ......... *H04L 65/70* (2022.05); *H04N 21/4402* (2013.01); *H04N 21/4621* (2013.01); *H04N 21/8456* (2013.01)

(58) Field of Classification Search
CPC .............. H04L 65/607; H04N 21/4402; H04N 21/4621; H04N 21/8456
USPC ........................................................ 709/219
See application file for complete search history.

(56) References Cited

U.S. PATENT DOCUMENTS

| | | | |
|---|---|---|---|
| 9,570,113 B2 * | 2/2017 | Campbell | H04N 9/8211 |
| 9,721,393 B1 * | 8/2017 | Dunn | G09G 5/005 |
| 10,650,590 B1 * | 5/2020 | Topiwala | G06F 3/011 |
| 2008/0126109 A1 * | 5/2008 | Cragun | G06Q 30/0603 709/223 |
| 2012/0212579 A1 * | 8/2012 | Frojdh | H04N 13/161 348/43 |
| 2015/0135234 A1 * | 5/2015 | Hall | H04N 21/8133 725/59 |
| 2015/0229695 A1 * | 8/2015 | Kim | H04N 21/4384 709/219 |

(Continued)

*Primary Examiner* — Imad Hussain
(74) *Attorney, Agent, or Firm* — Browdy and Neimark, PLLC

(57) ABSTRACT

A computerized method that may include (i) receiving, by one or more slicers, multiple input streams, the multiple input streams comprise (a) an input video stream that comprises visual information obtained from an event, and (b) at least one additional stream related to the event; (ii) converting the multiple input streams to a group of EIS-CVSs, different input streams are mapped to different EIS-CVSs; (iii) determining, by one or more personalization entities, a content to be sent to one or more user devices; (iv) generating, by the one or more personalization entities and based on the determining, the at least one personalized content stream to be sent to one or more user devices; and (v) sending the at least one personalized content stream to the one or more user devices.

18 Claims, 5 Drawing Sheets

(56) References Cited

U.S. PATENT DOCUMENTS

| | | | |
|---|---|---|---|
| 2017/0272805 A1* | 9/2017 | Richman | H04L 67/02 |
| 2019/0172124 A1* | 6/2019 | Eubanks | G06F 16/9577 |
| 2020/0204841 A1* | 6/2020 | Van Brandenburg | H04N 21/4728 |
| 2020/0244942 A1* | 7/2020 | Maze | H04N 5/23238 |

* cited by examiner

METHOD AND SYSTEM FOR MULTI-CHANNEL VIEWING

CROSS REFERENCE

This application claims priority from U.S. provisional patent 62/866,149 filing date Jun. 25, 2019.

This application is a continuation in part (CIP) of U.S. patent application Ser. No. 16/795,619 filing date Feb. 20, 2020. U.S. patent application Ser. No. 16/795,619 claims priority from U.S. provisional patent 62/807,933 filing date Feb. 20, 2019.

The two provisional patents and U.S. patent application Ser. No. 16/795,619 are incorporated herein by reference.

BACKGROUND OF THE INVENTION

Various events such as but not limited to live shows, VOD content, UGC, sport events and the like are viewed by multiple cameras that may acquire video streams from different angles and/or different locations, data feeds, social feeds, personal feeds (feed might be data, voice video or a mix).

There is a growing need to enable a user to select the video stream he is interested in alongside additional data streams (messaging, vlogger streams, volumetric video etc.).

SUMMARY

There may be provided a method, system and non-transitory computer readable medium for allowing a user to control the video stream the user receives.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
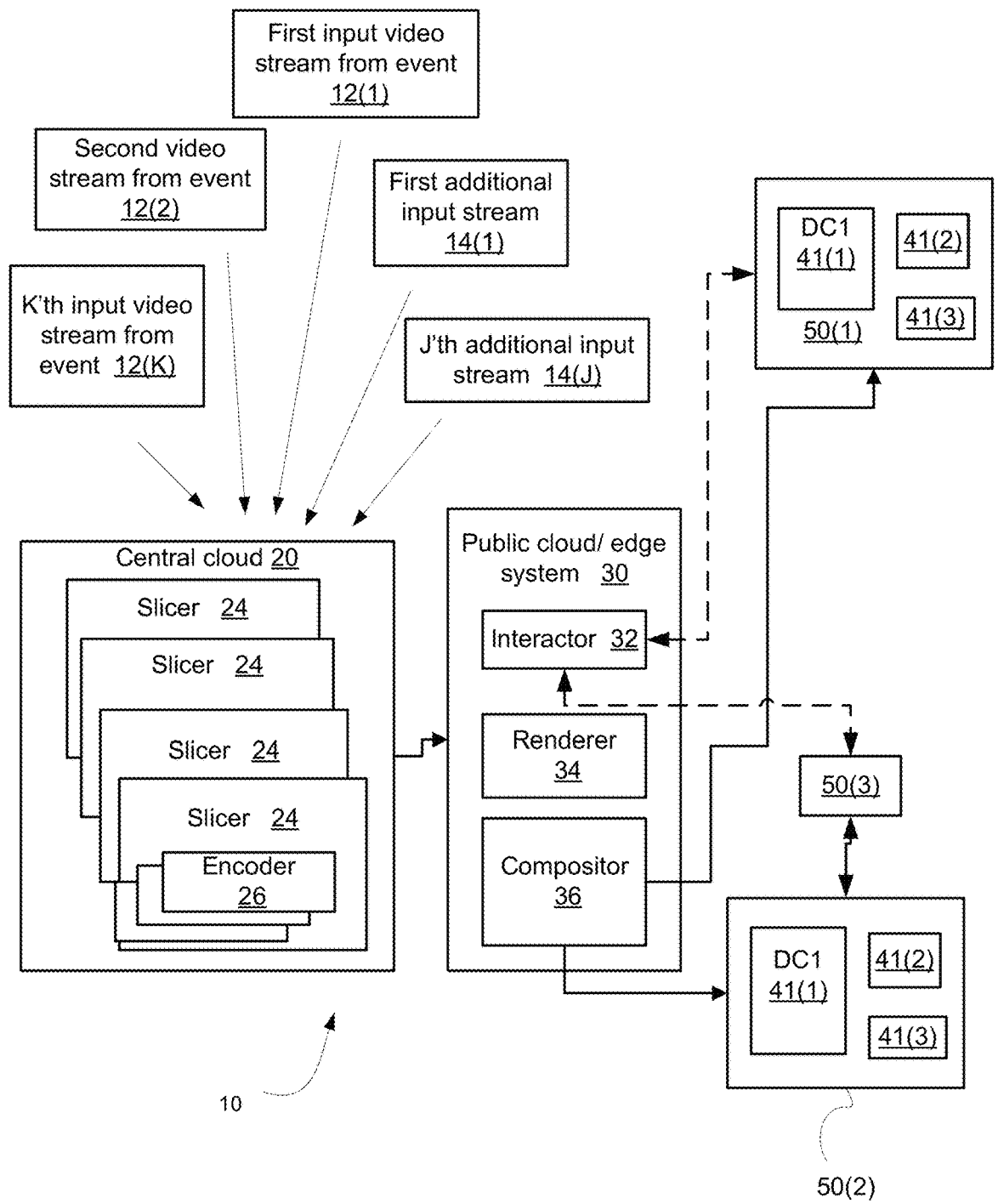
FIG. 1 illustrates an example of a system and its environment.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The terms "tile", "slice" and "encoded independent self-contained video stream" are used in an inter changeable manner. The encoded independent self-contained video streams are also referred to as EISCVSs. For example—tiling may include generating EISCVSs.

The terms "feed" and stream" are used in an interchangeable manner.

There may be provided a system, a method, and a non-transitory computer program product for the provision of high quality real time video streams to a user device under the control of the user.

The user may receive (from an interactor) thumbnails or other compact representations of the video streams (video streams of the event and optionally also video streams or audio streams from commentators or any other third party that may describe the event).

The following text and related figures may include examples of slicers and personalization entities. The slicers and/or the personalization entities may be located anywhere—especially between stream sources and end user devices. It should be noted that at least a part of a personalization entity and/or a slicer may be implemented by a user device.

The following text and related figures may refer to an input video stream of an event. The input video stream may refer to more than a single event or may be related to any action or subject matter.

FIG. 1 illustrates an example of a system 10 and its environment.

The system 10 may receive multiple input video streams (for example K input video streams from an event 12(1)-12(K), and multiple additional input streams (for example J additional input streams 14(1)-14(J). In FIG. 1 the slicers are located in central cloud 20. They may be located elsewhere.

The number of input streams may change over time. The additional input streams may be video streams and/or video streams—for example social network inputs, commentators, personal feeds of an end user, and the like.

Multiple slicers 24, each including one or more encoders, are configured to generate EISCVSs. The EISCVSs may be cached and/or sent to public cloud/edge system 30 that includes interactor 32 for interacting with user devices, a renderer 34 and a compositor 35.

A non-limiting example of generating EISCVSs is illustrated in U.S. patent application Ser. No. 16/795,619 filing date Feb. 20, 2020.

The interactor interacts with user devices such as first user device 50(1) and second user device 50(2). The number of user devices may well exceed two. The first and second user devices 50(1) and 50(2) include first and second displays.

The first user device 50(1) includes a display and a controller (not shown). The second user device 50(2) is controlled by a controller 50(3) that does not belong to the second user device. The controller may be, for example, a mobile phone. The first and second displays are illustrated as displaying the same displayed content played streams DC1-DC3 41(1)-41(3). The end users may belong to a group of user device scheduled for synchronized viewing. The number of displayed streams, the organizations of the streams on the displays of each display may differ from those illustrated in FIG. 1.

The user may select (or the platform might select it for hum) which one or more video streams he wants to receive on a displaying user device and may also (optionally) determine the shape and/or size and/or location of one or more display segments on which the one or more video streams are presented.

System 10 may receive multiple video streams from the event, external sources, social or personal feeds and may generate modular content pieces (referred to as slices) of these multiple video streams. The multiple video streams may be all the video streams obtained from the event or part of all of said video streams. The generation of the slices may be performed by slicers of the system. The slicers of the system may be followed by personalization entities that may generate content per user request. The personalization entities may be located in the cloud, in an edge device or anywhere up to the end user device downstream to the slicers. 'Edge' could be a processing module responsible to processes requests in a country/municipal/neighborhood/building/apartment/end user device level.

The edge receives tiles that can be easily processed and rendered into a single stream (or more upon end user device capabilities)

Through this tiling approach, that system may process (encode/transcode) many streams (video feeds) simultaneously, over a small finite amount of processes close to the origin, on the server side ('Slicer'), creates tiles that will be composited (rendered) in the compressed domain and providing a personal viewing experience per viewer at scale.

Alongside this scalable approach of preparing modular content pieces (spatial/temporal) that potentially can fit a large set of screen compositions/combinations, platform is also able to process/render unique elements dedicated for the specific user consuming the live unicast (personal friends, personal chats/data) and incorporate them in the user-designed layout (on the 'Renderer'). This can be done in the cloud or at the edge closest to the user, assuming low processing resources are required.

These user's actions are handled on the server side and eventually lead to rendering the user specific data (friends—video feeds of friends of the user—co-view, feed from a mobile device of a user—such as a WhatsUp clip selected by the user—that may originate from YouTube or any other feed deemed to be private to the user public data streams like Twitter, if any) and also lead to the user-specific composition being ran to serve the specific user. The personalization entities may include an interactor that interacts with the user, a renderer and a compositor. The composition stage ('Compositor') is extremely lightweight and is being done on the fly as the composition is performed post compression, with no need to decode/encode the content, simply compositing bounded tiles, with restricted dependency (mv) among neighboring tiles. The composition is light weight since the rendering is done in the compressed domain (by processing the tiles) so that providing a personalized experience costs much less than personal encoding—whereas personal encoding is less efficient by a factor of at least five till ten thousand.

Eventually the client (hosted on the user device) is served with a single feed encapsulating the user's experience (might be single stream or more upon end user deice capability), based on his selections, built from tiles from different sources, packed together.

In its basic form, the user device only has to have a screen and ability to receive and playback a standard Internet streaming protocol (HLS/DASH). The device could be a TV screen, mobile phone, tablet or alike. This makes complex feeds (personal, composite) to be consumed by limited devices (compute/render power, battery limitations) behind limited downlink bandwidths.

The same user device may be used to display the selected content and to control the interaction. Alternatively—one user device may be used as control for interacting while another user device may be used for displaying the content. For example—a television may be controlled by a mobile phone.

The user interactions (selections/camera switching, Voice over IP/communication with friends) can be executed over a mobile phone device, acting as a remote control or automatically by the platform and or by handing over control to other end user. Thus controlling the user-specific interactions.

A process of pairing between the big screen (for example television) and a mobile device can be done based on existing pairing procedures of BT/WiFi handshake procedure (Chromecast/AirPlay like).

The tiles may be related to codecs: H265/AV1/VP9 or any other codec with native support for tiles 64.

Several compositors may also be synchronized to provide a synchronized experience to a group of users, to enable synced communications of video and VoIP throughout the viewing session.

The system may be configured to execute at least one out of (a) time line synchronization, (b) dynamic tiling and (c) prediction & fragmented caching.

Time line synchronization, the platform supports feeds synchronization in two layers: feeds synchronization and end users synchronization. The mechanism is built on a virtual clock which runs in two layers: the first layer makes sure all the external feeds are aligned: camera feeds, news, data, statistics, social feeds (twitter, etc'), this is to avoid "spoilers" by external resources/feeds. The second layer align joint, virtual time line between end users to allow natural interaction and communication. The external feeds may be associated in advance with events that are the subject of the input video streams.

Feeds synchronization: based on context, syntax, video/audio sync mark or by extracting those by analyzing content (video/audio/others) the platform is capable to set a new unified time line for all the feeds. Making sure all of them will be aligned with a single time line. the new time line might become internally or by external source. Example: feeds might contain broadcast feed, few fixed and mobile cameras, internal data (jumbotron), external data and social feeds (twitter), some have their own clock some not—in that case the game clock will be used as the virtual joint clock for all, based on voice synchronization and or content analysis all the feeds will be delayed to a shared joint clock, from that point all the tiles will eb aligned to single time line.

Users synchronization: different end users will face different delay thus will get the content (original or personalized) at different times. The platform is capable to align time lines between end users (different delays) that co view the content. The platform will set a joint time line that will be derived from the feeds and relevant feeds, network condition, end users parameters and content type. each end user device or relevant edge in case of direct distribution will buffer the video to meet the joint time line. The joint time line might be adapted long the time. The platform gets the different delays from end users and based on the network conditions and the relevant end users that co view the content the platform sets a virtual clock for that group, each virtual group might end with a different clock. The virtual clock is shared and edges/end users devices buffer content.

Dynamic tiling based on content nature and network characteristics, the split into tiles can be adaptive, actual size might be derived from network condition, processing capabilities, target resolution and or content nature. Content nature might be the type of the content: news/sport/animation/reality show it might be based on the nature of the content: high motion, talking heads, etc' and it might be based on the content analysis: adaptive ROI (based on analytic, the basket for example) and or context such as events (gao, kiss, etc')

Prediction & Fragmented caching. The tiling approach allow fragmented caching. Instead of caching entire steam in binary way the platform allow prioritization meaning part of the tiles (feeds or part of feeds) might be cached while other are not. A simple example: a combined experience based on several feeds (Camera angel, social feeds), few tiles (that were taken from an original feed) and personal feed (video conferencing) might get some of them cached and other directly without caching. The prediction is based on data points which are either assumed or configured (for example the main feed from the broadcaster will get priority in caching while secondary feeds will get less priority) or adapted based on true consumption by end users during the show.

Figure 2:
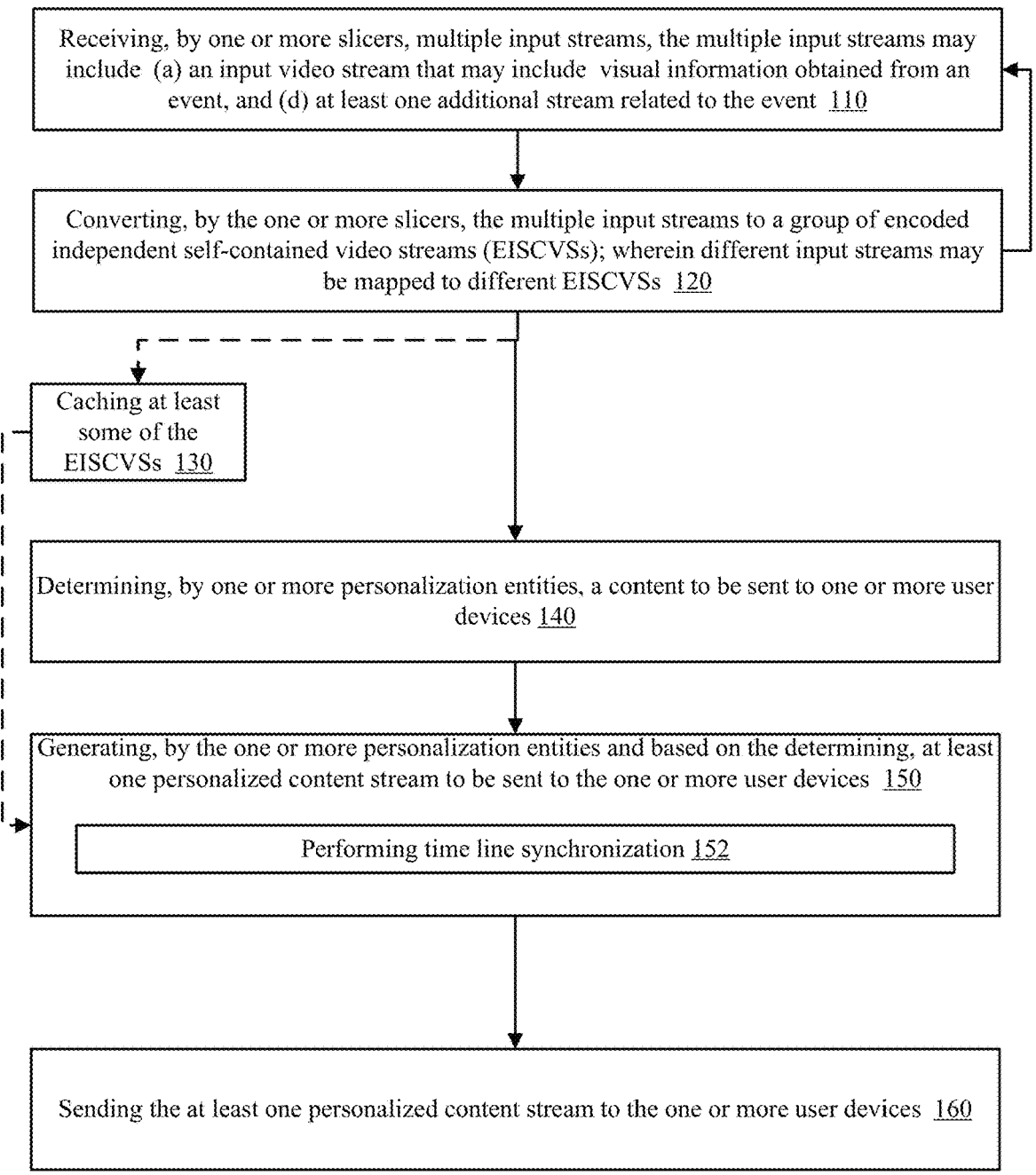
FIG. 2 illustrates an example of a method.

FIG. 2 illustrates an example of a method 100 for transmitting one or more video streams to a user device.

Method 100 may start by step 110 of receiving, by one or more slicers, multiple input streams, the multiple input streams may include (a) an input video stream that may include visual information obtained from an event, and (d) at least one additional stream related to the event.

Step 110 may be followed by step 120 of converting, by the one or more slicers, the multiple input streams to a group of encoded independent self-contained video streams (EISCVSs); wherein different input streams may be mapped to different EISCVSs.

A single input stream may be converted to multiple sets of EISCVSs, each set may represent a different version of the input stream. The different versions may differ from each other by resolution and/or size and/or the content itself. For example—different sets that represents different sizes of input stream may be transmitted based on the current available bandwidth. Multiple EISCVSs may be time-shifted encoded—to facilitate fast switch between different versions of a stream.

Step 120 may be responsive to at least one out of a type of the event and a motion parameter of the content.

Step 120 may include performing a codec-agnostic process.

Step 120 may be followed by step 110.

Step 120 may be followed by step 130 of caching at least some of the EISCVSs.

Step 120 may be followed by step 140 of determining, by one or more personalization entities, a content to be sent to one or more user devices.

Step 140 may include, may be preceded by or may be responsive to an interacting, by the one or more personalization entities, with the one or more user devices.

Step 140 may be followed by step 150 of generating, by the one or more personalization entities and based on the determining, at least one personalized content stream to be sent to the one or more user devices.

Step 150 may include selectively retrieving cached EISCVSs to one or more personalization entities.

Step 150 may be followed by step 160 of sending the at least one personalized content stream to the one or more user devices. The sending may include performing any action that will facilitating the provision of the at least one personalized content stream to the one or more user devices. This may include associating with the address of the one or more user devices, transmitting downstream, storing in a memory unit (for example buffer), triggering a transmission, and the like.

The content may include video content from one or more input video stream, may include additional content of one or more of the at least one additional stream or may include a combination of a video content and additional content.

When herein when the content includes video content and additional content, then the at least one personalized content stream may include the video content and the additional content.

Step 150 may include step 152 of performing time line synchronization. This may include feeds synchronization and end users synchronization. The end users synchronization may occur when a group of end users for a group scheduled for synchronized viewing of the at least one personalized content stream.

The feeds synchronization may include aligning between points of time of the event associated with the video content and points of time of the event associated with the additional content. For example—video content related to a certain moment during the event will appear at the same time as additional content related to the event—so that the end user will not receive a tweet "Goal" before receiving a video content describing the goal. It should be noted that additional content regarding the point of time may follow the video content of that point of time.

When end user synchronization is applied then step 152 may include sending the at least one personalized content stream so that the at least one personalized content stream may be displayed simultaneously by the user devices of the group.

Step 152 may include estimating display related parameters of the user devices of the group; and wherein the sending may be responsive to the display related parameters. The display related parameters may include at least one out of delay and transmission rate.

Figure 3:
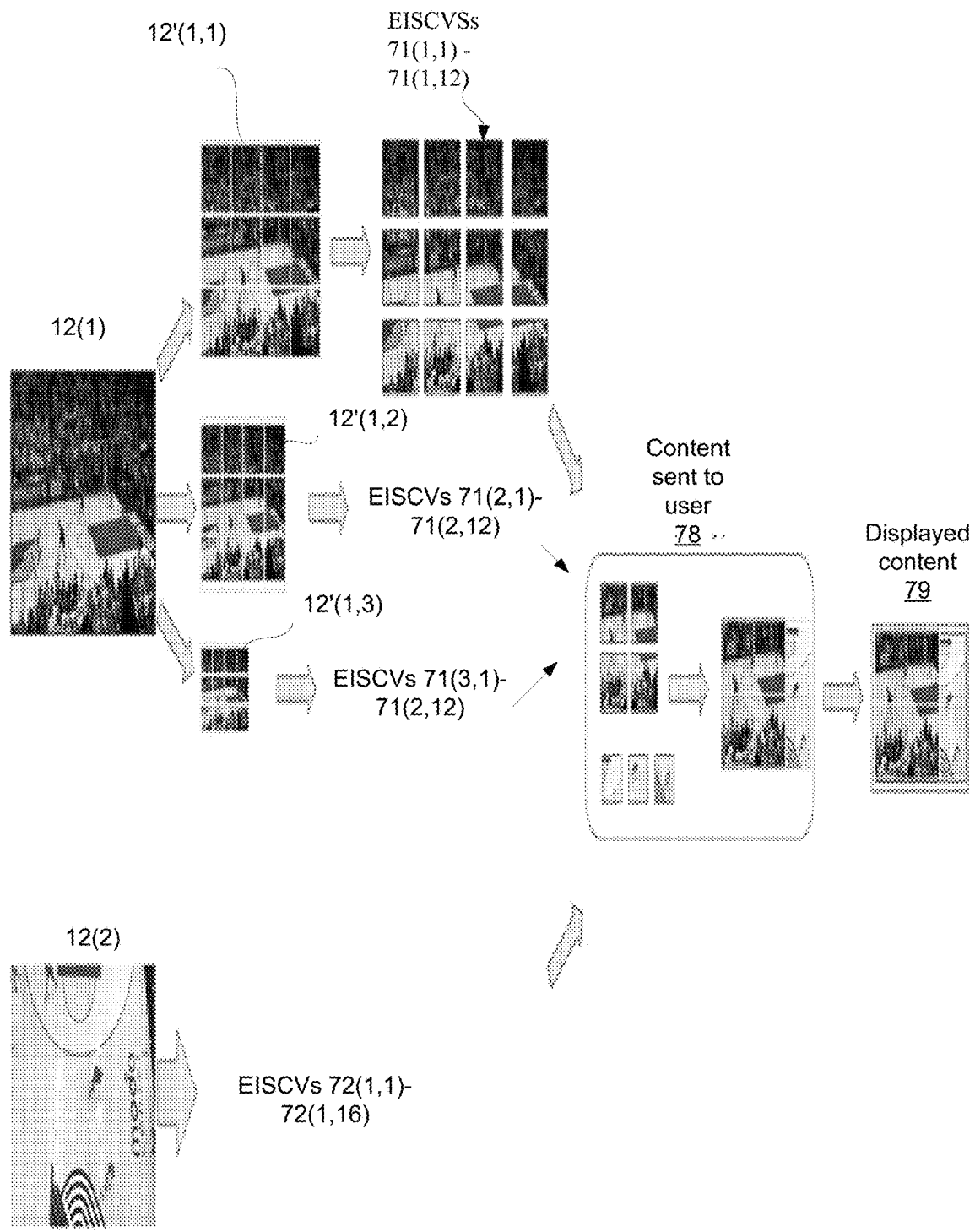
FIG. 3 illustrates an example of a various streams and data structures generated during the method.
Figure 4:
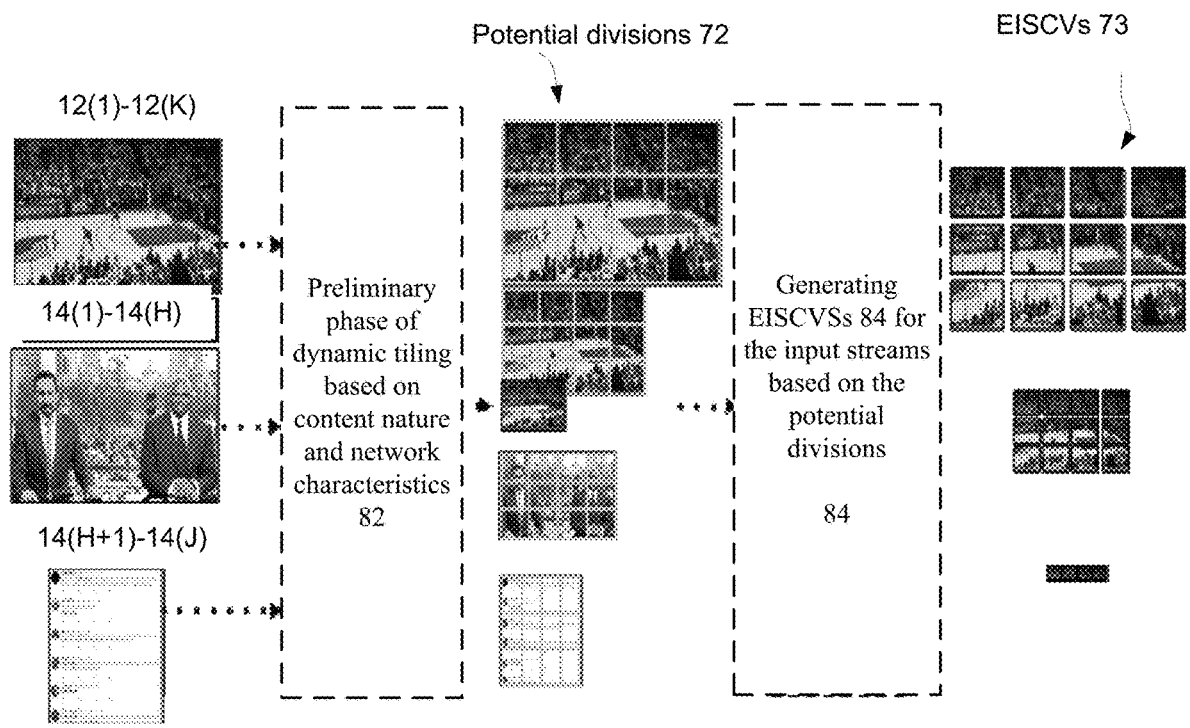
FIG. 4 illustrates an example of a various streams and data structures generated during the method.
Figure 5:
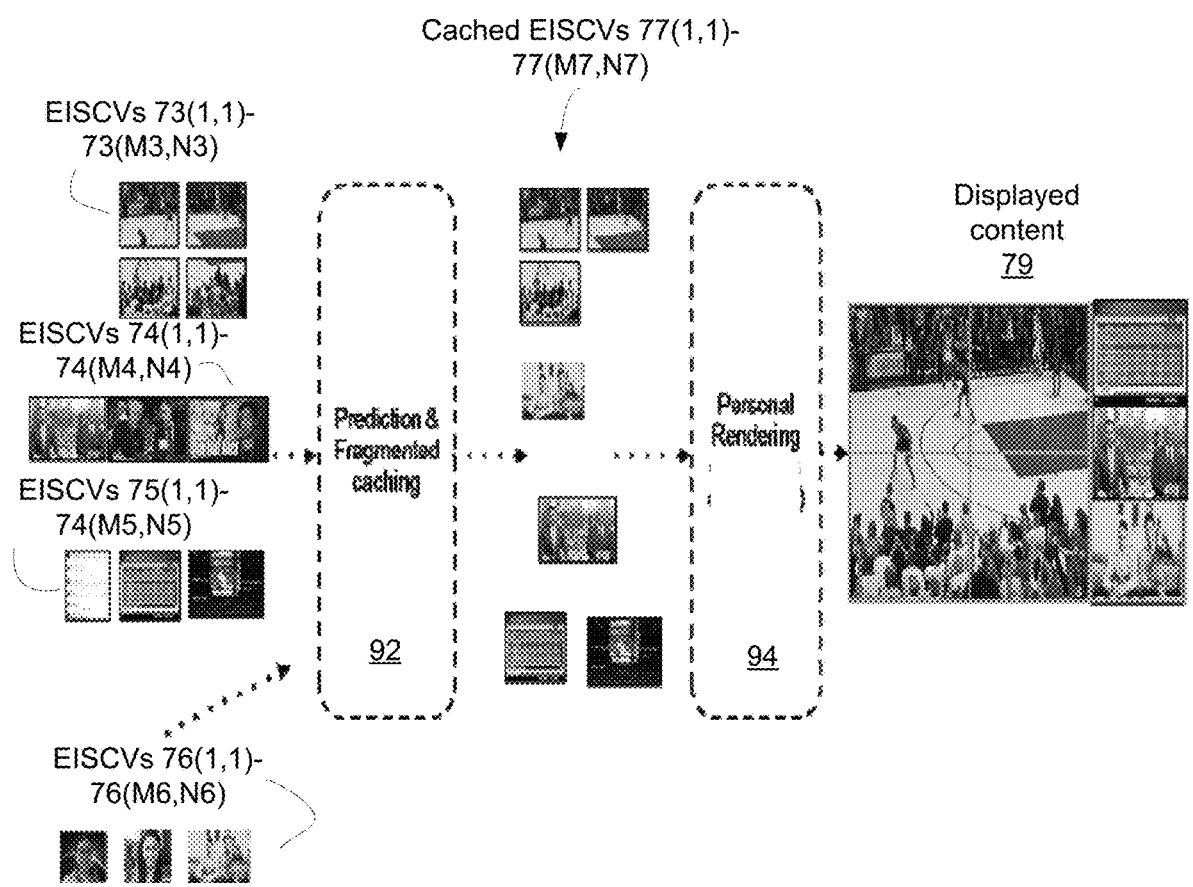
FIG. 5 illustrates an example of a various streams and data structures generated during the method.

FIG. 3-5 illustrate various streams and data structures generated during the method.

In FIG. 3, steps and data structures and/or media units related to the steps are illustrated from left to right:

a. Receiving a set of input streams from the event, other sources (commentators, social media). In FIG. 2 there are a first input video stream 12(1) and a second input video stream 12(2).

b. Converting the input streams to multiple encoded independent self-contained video streams (tiles), of various resolutions—wherein each tile "covers" a spatial segment of the source stream. The tiles may be of the same shape and/or size, but at least one tile may differ from another tile by shape and/or size. The tiles can be in different resolution, bit rates, same or different frame rate/GOP structure. FIG. 3 illustrates three different versions (different resolutions) of the first input video stream that are virtually segmented to provide three arrays of segments 12'1(1,1), 12'(1,2) and 12'(1,3) that will be converted to three sets of EISCVSs (each set includes twelve EISCVSs)-EISCVSs 71(1,1)-71(1,12), EISCVSs 71(2,1)-71(2,12) and EISCVSs 71(3,1)-71(3,12). This is done at the encoder side—probably in the network. The EISCVSs may have a certain duration (for example half a second or more depends on environment needs), or of various durations. The second input video stream may be converted to one or more sets of EISCVSs such as EISCVSs-EISCVSs 72(1,1)-72(1,12).

The user may request, at a certain point of time, in an interactive manner throughout the viewing, a subset of tiles. This could be based on explicit selection of camera angles, additional stream such as a vlogger feed (a person who is creating live video content), event/game statistics or other sources of a one-to-many nature, selection can be in not explicit way via platform selection or by handing control to others. The user (or the platform) may also request streams that are of one-to-one nature like a conference call, audio feeds, commercials, or following a specific social feed (twitter feed) to be composited alongside those one-to-many feeds.

The topology of tiles (sizes, number of columns/rows, uniformity) can be changed interactively throughout the broadcast.

Bitrate biases can be incorporated interactively throughout the broadcast to allocate more bitrate (quality) to some ROIs (regions of interest), or feeds. These can be defined manually or triggered by an automated apparatus based on, but not restricted to, machine learning or computer vision algorithms.

The user can receive embedded ads within the received personal stream, composed alongside the other video or data streams. This can be based on existing ads targeting systems and can include, but not limited to the following ad units/formats: video ads, web display ads, all of existence today within online ad inventories.

The slicer sends to the relevant edge the relevant tiles. This may be done through the use of an intermediate distribution network like a CDN (Content Delivery Network)/backbone or any other or an edge based caching mechanism. All relevant tiles are sent as a single stream and can be decoded by a single decoder on the user's side. The tiles are generated to provide content sent to the user 73—that eventually appears as displayed content 79 on a display of the user device.

The method may be applied to the provision of multiple streams to multiple user devices and or edges simultaneously—thus steps may be executed in parallel and independently—each user may receive the combined tiles relevant to them alone.

The partition to tiles and then the sending the tiles of interest to each user device greatly simplifies the process and allows to support multiple user devices that may view the event at different points of views (selections) at the same time.

FIG. 3 illustrates a point in time during which three users executed different selections—and receive at the same time different combinations of tiles, including both one-to-many and one-to-one feeds. FIG. 3 also illustrates the streams displayed on a display of a user device.

Hybrid approached night be applied in which the rendering (personalization) is done in more than one location, that can be done due to network load in which several edges can be allocated each of them covering part of the personalization based on the feeds they get or any other limitations capabilities derived from their nature, location or role. In that context end user device (based on their capabilities) can be rendering (part or the entire) the content as well, example: personal feeds might be rendered at the end user device and add tile while the rest of the experience was rendered at the edge before.

The composer may define which tiles will be part of the sent content. The renderer may stitch the selected tiles together. In case of hybrid approach a first composer may define the overall feeds combination. Next—a first renderer may deal with some of the streams, and another may stitch some other streams. For example—the first may stitch general or highly popular streams and the second (may be located at a different edge device and even on an end user device) may stitch personal or less popular streams.

In the hybrid approach the platform allow flexibility in two dimension: resources allocation: the processing and the personalized rendering can be done either is centralized location or can be done is distributed way by several edges/clouds each covering part of the final experience. The second is hierarchy mode in which several edges along the value chain will be involved in the personalized experience. Example: the network edge will render part of the experience (content and data fees) while the personal edge (mobile for example) will be used to render (in addition) personal feed (video for example).

End user device might be the viewing device (TV for example) or mobile device/PC that can be used either for viewing or near edge (for hybrid approach).

The method splits the generation and processing of video streams between the server/cloud and the edges/user devices. Thus offloading most of the processing to the server into one time processing that not impacted by the amount of different end users permutations.

The renderer acts completely in the compressed domain thus reach high density and volume. Once there are tiles the following steps are executed in the tiles domain—in the compressed domain. The stitching may include headers alignment (no need to open and decode up to pixel resolution). thus the entire process is lightweight.

The output from the slicers are independent compressed tiles (that can be transcoded and decoded independently), each is compressed using H.265 or any standard or any protocol that can support tiling. The tiles are being distributed to the edges where they are reconstruct (rendered) based on the users selection (compositor). The compositor assure that the overall combination of tiles is aligned with frame size, GOP structure, FPS and other video parameters (headers level). the renderer does not need to decode the tiles to pixels resolution thus can provide efficient light weight rendering.

Multi-GoP structures might be applied (for tiles: some or all) for efficient streams switching (GoP—group of pictures).

The slicer may operate on video feeds, in case the stream is not video (example: twitter), it is converter (before the slicer or even by the slicer) into video format with the proper resolution, FPS and bitrate.

It should be noted that streams that should be time aligned with the virtual timeline, should be defined and listed in advance by the content/service provider. External commentators feeds can reach higher synchronization accuracy if they are pre-defined, in such case commentators can get the original feed before the rest of the end users gets it and provide optimized.

The composer defines which tiles will be part of the experience . . . the renderer is doing the "stitching" (in case of hybrid approach the first composer defining the overall feeds combination but here we have two (or more) renderers).

The rendering stage may be based on specific end user selection (reflected at the composer). The renderer gets the relevant tiles list to be rendered and orchestrates them into a single videos stream according to the relevant supported codec. Orchestration is based on headers alignment, and tiling work to make sure 100% coverage and no overlapping.

FIG. 4 illustrates a process that includes:
a. Receiving multiple input streams such as video streams of the event 12(1)-12(K), additional streams from sport commentators 14(1)-14(H) and additional streams from social networks 14(H+1)-14(J)
b. Performing a preliminary phase of dynamic tiling based on content nature and network characteristics 82 to provide potential divisions 72 of the input streams.
c. Generating EISCVSs 84 for the input streams based on the potential divisions 72—for example this may include generating one or more sets of EISCVSs of different resolutions and/or bitrate for one or more of the input streams. Step 84 may include time line synchronization. The EISCVSs are denoted 73.

FIG. 5 illustrates a process that includes:
a. Receiving EISCVSs such as EISCVSs 73(1,1)-73(M3,N3) related to input video streams of an event, EISCVSs 74(1,1)-74(M4,N4) related to commentators streams, EISCVSs 75(1,1)-75(M5,N5) related to social media streams and EISCVSs 76(1,1)-76(M6,N6) related to private feeds.
b. Performing prediction and fragmented caching 92 of the received EISCVSs to provide cached EISCVSs 77(1,1)-77(M7,N7)—that may include some of all of the received EISCVSs.
c. The personal rendering 94 may use at least some of the cached EISCVSs to provide displayed content 79.

There may be provided a method that may generate different quality (and thus size) representations of video streams.

A user may switch between different quality levels each predefined period. Based on user's selections or quality of network (bandwidth and latency constraints).

The quality of the required video stream viewed by the user may change much faster than the one each four seconds—for example as a result of a frequent change in selection by the user—thereby a relevant tile may become irrelevant and vise verse.

In order to allow a user to make changes at higher frequencies while keeping temporal compression efficiency there may be provided multiple time-shifted encoded independent self-contained video streams (time shifted tiles). The user device, immediately after a change in selection may jump to the closets time shifted version of the new tiles of interest.

In band data may be included in the video stream—each tile—may include in-band data located at a predefined location in the tile—regarding the location of the tile within the field of view. For example—in the bottom line of the tile. This is read by the graphic image processor—information represented by various combinations of colors of pixels. The in line data may include fields such as Sequence Parameter Set (SPS) and the Picture Parameter Set (PPS) of H264.

The method may include generating from streams acquired by different cameras located at different locations a 3D model (cloud of points) and then deciding which point of view to transmit (even a point of view that was not actually acquired by a camera).

The method may include receiving such streams information and allowing the user to skip between virtual cameras—and sending him tiles related to the point of view. The change of view from one virtual camera to the other may be done at the same manner of replacing one tile by the other.

A common application that can also be used is having unlimited amount (bounded to screen's physical resolution) of feeds ordered in a PiP (Picture-in-Picture) form, a task currently unattainable by existing TV screens (limited to 2-3 decoders).

The method brought here could be used as part of a hybrid method, where the client device is also conducting some of the processing/rendering alongside the composed stream received from the server. This can be, but not limited to graphics overlays, GUI (graphical user interface), transition animations.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner. The integrated circuit may be a system on chip, a general-purpose processor, a signal processor, a Field Programmable Gate Array (FPGA), a neural network integrated circuit, and the like.

Any one of the slicers, and personalized entities may be or may include at least a part of an integrated circuit or may be hosted or executed by a processing circuit that comprises at least a part of an integrated circuit.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A computerized method for generating at least one personalized content stream, the method comprising:
   receiving, by one or more slicers that are located in a cloud computing environment, multiple input streams, the multiple input streams comprise (a) an input video stream that comprises visual information obtained from an event, and (b) at least one additional stream related to the event;
   converting, by the one or more slicers, the multiple input streams to a group of encoded independent self-contained video streams (EISCVSs); wherein different input streams are mapped to different EISCVSs; wherein the converting is responsive to an adaptive determination of a region of interest captured within each of the multiple input streams;
   determining, by one or more personalization entities located at one or more edge systems, a content to be sent to one or more user devices;
   generating, by the one or more personalization entities and based on the determining, the at least one personalized content stream to be sent to one or more user devices; and
   sending the at least one personalized content stream to the one or more user devices; when the one or more user devices are multiple user devices, a timing of the sending is based on delays related to a transmission to the multiple user devices and network conditions;
   wherein when the content comprises a video content from the input video stream and additional content from one of the at least one additional stream, then the at least one personalized content stream comprises the video content and the additional content.

2. The method according to claim 1 wherein when the content comprises the video content and the additional content, then the generating comprises performing aligning between points of time of the event associated with the video content and points of time of the event associated with the additional content.

3. The method according to claim 1 wherein the one or more user devices are a group of user device scheduled for synchronized viewing of the at least one personalized content stream; and wherein the method comprises sending the at least one personalized content stream so that the at least one personalized content stream is displayed simultaneously by the user devices of the group.

4. The method according to claim 3 wherein the method comprises estimating display related parameters of the user devices of the group; and wherein the sending is responsive to the display related parameters.

5. The method according to claim 4 wherein the display related parameters comprise at least one out of delay and transmission rate.

6. The method according to claim 1 wherein the converting is responsive to at least one out of a type of the event and a motion parameter of the content.

7. The method according to claim 1 comprising caching at least some of the EISCVSs in network cache memory units, and selectively providing cached EISCVSs to one or more personalization entities.

8. The method according to claim 1 wherein the converting is executed by performing a codec-agnostic process; and wherein some EISCVSs comprise visual information from different spatial segments of the at least one input video stream; and wherein two or more EISCVSs comprise visual information from same spatial segments but are time shifted from each other by a time shift that is shorter than a duration of each one of the two or more EISCVSs.

9. The method according to claim 1 comprising (a) interacting, by the one or more personalization entities, with the one or more user devices, and (b) rendering one or more EISCVSs in a compressed domain.

10. A non-transitory computer readable medium that stores instructions for:
   receiving, by one or more slicers that are located in a cloud computing environment, multiple input streams, the multiple input streams comprise (a) an input video stream that comprises visual information obtained from an event, and (d) at least one additional stream related to the event;
   converting, by the one or more slicers, the multiple input streams to a group of encoded independent self-contained video streams (EISCVSs); wherein different input streams are mapped to different EISCVSs; wherein the converting is responsive to an adaptive determination of a region of interest captured within each of the multiple input streams;
   determining, by one or more personalization entities located at one or more edge systems, a content to be sent to one or more user devices;
   generating, by the one or more personalization entities and based on the determining, at least one personalized content stream to be sent to the one or more user devices; and
   sending the at least one personalized content stream to the one or more user devices; when the one or more user devices are multiple user devices, a timing of the sending is based on delays related to a transmission to the multiple user devices and network conditions;
   wherein when the content comprises a video content from the input video stream and additional content from one of the at least one additional stream, then the at least one personalized content stream comprises the video content and the additional content.

11. The non-transitory computer readable medium according to claim 10 wherein when the content comprises the video content and the additional content, then the generating comprises performing aligning between points of time of the event associated with the video content and points of time of the event associated with the additional content.

12. The non-transitory computer readable medium according to claim 10 wherein the one or more user devices are a group of user device scheduled for synchronized viewing of the at least one personalized content stream; and wherein the method comprises sending the at least one personalized content stream so that the at least one personalized content stream is displayed simultaneously by the user devices of the group.

13. The non-transitory computer readable medium according to claim 12 that stores instructions for estimating display related parameters of the user devices of the group; and wherein the sending is responsive to the display related parameters.

14. The non-transitory computer readable medium according to claim 13 wherein the display related parameters comprise at least one out of delay and transmission rate.

15. The non-transitory computer readable medium according to claim 10 wherein the converting is responsive to at least one out of a type of the event and a motion parameter of the content.

16. The non-transitory computer readable medium according to claim 10 that stores instructions for caching at least some of the EISCVSs in network cache memory units, and selectively providing cached EISCVSs to one or more personalization entities.

17. The non-transitory computer readable medium according to claim 10 wherein the converting is executed by performing a codec-agnostic process; and wherein some EISCVSs comprise visual information from different spatial segments of the at least one input video stream; and wherein two or more EISCVSs comprise visual information from same spatial segments but are time shifted from each other by a time shift that is shorter than a duration of each one of the two or more EISCVSs.

18. The non-transitory computer readable medium according to claim 10 that stores instructions for (a) interacting, by the one or more personalization entities, with the one or more user devices, and (b) rendering one or more EISCVSs in a compressed domain.

* * * * *